2,832,811

HYDROLYSIS OF ETHYL CHLORIDE IN LIGHT HYDROCARBONS

Harry G. Boynton and Joseph T. Horeczy, Baytown, Tex., assignors, by mesne assignments, to Esso Research and Engineering Company, Elizabeth, N. J., a corporation of Delaware No Drawing. Application June 28, 1954
Serial No. 439,886

6 Claims. (Cl. 260—676)

The present invention is directed to a method of removing alkyl chlorides from hydrocarbons containing them. More particularly, the invention is concerned with removing alkyl chlorides from hydrocarbons in the gasoline and lighter boiling range.

This application is a continuation-in-part of Serial No. 281,042, filed April 7, 1952, now abandoned entitled "Hydrolysis of Ethyl Chloride in Hydrocarons" which is a divisional application of Serial No. 227,267, filed May 19, 1951, now U. S. Patent No. 2,761,888, in the names of Joseph T. Horeczy and Harry G. Boynton, entitled "Hydrolysis of Alkyl Chlorides in Hydrocarbons."

In the catalytic conversion of hydrocarbons in which aluminum chloride is used as a catalyst, such as in the alkylation of an isoparaffin with an olefin or in the isomerization of a normal paraffin in an isoparaffin, the product frequently contains alkyl chlorides which act as contaminants. The products, when isoparaffins are alkylated with olefins, usually boil in the gasoline boiling range and the alkyl chloride contaminating the product also boils in the gasoline boiling range and as a result it is difficult to remove the contaminating alkyl chloride from the desired product.

In the aforementioned alkylation, it is customary to alkylate isobutane with ethylene and the like. The products contain alkyl chlorides and also the unreacted iso and normal butanes which are an effluent from the operation are contaminated with ethyl chloride. This ethyl chloride is formed during the alkylation of isobutane with ethylene in the presence of aluminum chloride catalyst and HCl promoter by a reaction which may involve ethylene and HCl. HCl appears to be quantitatively converted to ethyl chloride with a portion of the ethyl chloride, perhaps 10% to 20%, being consumed in promoting the alkylation reaction. The major portion of the ethyl chloride, however, passes out from the alkylation reaction zone in solution in the unreacted isobutane and the normal butane which usually is present with the isobutane. Ethyl chloride forms an azeotrope with isobutane which has been estimated by the method of Carlson and Colburn, Industrial Engineering Chemistry, vol. 34, page 585 (1943), utilizing the Van Laar equations to lie very close to the boiling point of pure butane. This with the boiling point of isobutane-ethyl chloride, azeotrope and isobutane being substantially identical, the ethyl chloride may not be readily separated therefrom by fractional distillation.

The presence of alkyl chlorides in hydrocarbons, when the hydrocarbons are to be used as a motor fuel, is quite detrimental in that certain of the alkyl chlorides act as detonating agents or may react with anti-knock agents which are added to the gasoline. It is, therefore, quite desirable that alkyl chlorides present in hydrocarbons for any reason and frequently as a result of a catalytic conversion operation should be removed therefrom before the hydrocarbon is generally suitable as a gasoline component and particularly an aviation gasoline component.

The presence of ethyl chloride in isobutane, fractionated from an alkylation reactor effluent, which would be recycled to the aluminum chloride saturater in the alkylation operation as a means of introducing fresh aluminum chloride to the reaction zone is quite detrimental. If the ethyl chloride is not separated from the isobutane recycle stream, the solubility of aluminum chloride in isobutane is adversely affected and severe sludging in the aluminum chloride saturater takes place. Concentrations above about 0.4 mole percent ethyl chloride in the butane passed through the aluminum chloride saturater may not be tolerated due to excess sludging. In concentrations of 0.1 mole percent, some sludging in the aluminum chloride saturater may occur. Without facilities for removal of ethyl chloride, ethyl chloride concentrations in excess of 0.4 mole percent may be built up in the isobutane recycle stream in a very short time. If efforts are made to separate the ethyl chloride by fractionation, the ethyl chloride may not be removed and in fact will be concentrated in the isobutane fraction.

Furthermore, if the total butane stream from an alkylation reactor is employed as a feed to an isomerization reaction zone in which aluminum chloride is employed and in which the aluminum chloride is carried into the reaction zone by pick-up with the feed, the same problem of sludging will exist in the aluminum chloride saturator and in the isomerization reaction zone. The fact of the matter is in both the alkylation and isomerization reactions employing aluminum chloride where ethyl chloride is present, the reaction rapidly becomes inoperable due to sludging.

Accordingly, the present invention may be briefly described as involving treating a light hydrocarbon such as normal butane and isobutane containing ethyl chloride by contacting the light hydrocarbon in the liquid phase with an aqueous solution of an alkali metal hydroxide at an elevated temperature for a sufficient length of time to convert the ethyl chloride to an alcohol following which the alcohol may be removed from the hydrocarbon and the treated hydrocarbon is recovered substantially free of ethyl halide.

Ordinarily the liquefied light hydrocarbon fraction which forms a feed stock of the present invention will contain an amount no greater than 5% by volume of an alkyl chloride. Usually the liquefied light hydrocarbon feed is a mixture of isobutane and normal butane and the feed may contain in the range from about 0.01 to 0.5 mole percent of ethyl chloride when aluminum chloride is employed as an alkylating agent and the light hydrocarbon, such as butanes is an effluent stream therefrom. The hydrocarbon feed stock may result from any processing operation in which it becomes contaminated with an alkyl chloride. As mentioned before, such operation may include the alkylation of an isoparaffin with an olefin when employing aluminum chloride as a catalyst or the isomerization of a normal paraffin to an isoparaffin employing aluminum chloride as a catalyst. When the hydrocarbon containing alkyl chloride is formed in the aforementioned alkylation operation and is in the gasoline boiling range, it may contain from about 1% to about 2% by volume of ethyl and/or isopropyl chloride. Likewise the hydrocarbon mixture may result from the chlorination of a hydrocarbon wherein a mixture of a hydrocarbon and alkyl chloride is obtained in which the mixture contains an amount no greater than 5% by volume of an alkyl chloride.

The hydrocarbon feed stock, as mentioned before, may boil in the gasoline boiling range from about 65° up to about 450° F. The hydrocarbon feed stock may have such a boiling range especially if it is formed by the alkylation of an isoparaffin with an olefin with the isoparaffin having 4 carbon atoms in the molecule and the olefins having from 2 to 4 carbon atoms in the molecule.

Generally the gasoline boiling hydrocarbons in an alkylate fraction of this nature may contain from about 5 to 16 carbon atoms in the molecule.

The light hydrocarbon employed in the present invention is preferably isobutane but may be a mixture of isobutane and normal butane. The feed stock to the present invention may suitably be obtained as an effluent from an alkylation reaction in which ethylene and isobutane are reacted to form an alkylate employing aluminum chloride as the catalyst.

The alkyl chlorides present in the hydrocarbon feed of the present invention will usually comprise ethyl and isopropyl chlorides. The alkyl chlorides serving as a contaminant in the feed stock of the present invention may be exemplified by the following compounds: tertiary butyl chloride, 2,3-dimethyl-2-chloro butane and secondary butyl chloride.

In practicing the present invention it is desirable to contact the contaminated hydrocarbon feed stock containing alkyl chlorides with an aqueous solution of an alkali metal hydroxide at an elevated temperature.

The elevated temperatures will range ordinarily from 180° to 500° F. with a preferred temperature in the range from about 290° to 500° F.

At the lower temperatures in the range given it is necessary that a longer time of contact be employed than at the higher temperatures. For example, at the lower temperatures it will be necessary to use longer contact times of the order of 50 to 60 minutes, whereas at the higher temperatures shorter contact times may be employed; for example, the time should usually be in excess of about 3 minutes depending on the temperature level at which the treating operation occurs. At about 325° F., in removing isopropyl chloride from an alkylate of the nature given, a contact time of about 35 minutes will give substantially complete removal of isopropyl chloride.

It is desirable to maintain the hydrocarbon which is being treated in the liquid phase; therefore, pressures may be superimposed during the reaction to maintain a liquid phase treatment.

The alkali metal hydroxide may be an aqueous solution of an alkali metal hydroxide, such as sodium, potassium or lithium hydroxide. It will be preferred, however, to use an aqueous solution of sodium hydroxide containing an amount of sodium hydroxide in the range between 1% and 30% by weight of the solution. A preferred range of sodium hydroxide concentration in the aqueous solution is an amount in the range between 2% and 15% by weight.

The present invention will be further illustrated by the following example:

EXAMPLE I

In order to illustrate the invention further, runs were made in which a butane fraction containing ethyl chloride was subjected to hydrolysis in the liquid phase at elevated temperatures ranging from 150° to 305° F. The butane fraction containing ethyl chloride was introduced into a turbo-treater having a capacity of approximately 5 volumes, the treater being equipped with a stirring device turning at a constant rate of about 850 R. P. M. The power consumption for this treater, according to the method of Olney and Carlson, "Chemical Engineering Progress," vol. 43, page 473, was found to be about 0.93 H. P. an hour per barrel, assuming a contact time of 30 minutes. In these runs approximately 2 volumes of aqueous sodium hydroxide solution and approximately 2 volumes of butane containing about 0.13 mole percent of ethyl chloride were employed. The sodium hydroxide solution contained about 10 wt. percent of sodium hydroxide. Samples were removed from the contacting apparatus after 15, 30 and 60 minutes' contact time and analyzed for chloride content. The results of these runs are presented in Table I.

TABLE I

| Temperature, ° F. | Percent Removal of Ethylchloride at indicated Contact Time | | |
|---|---|---|---|
| | 15 Minutes | 30 Minutes | 60 Minutes |
| 150 | | 4 | 6 |
| 200 | 19 | 25 | 42 |
| 250 | 87 | 97 | [1] 100 |
| 305 | 92 | [1] 100 | |

[1] 100% conversion was reached before the indicated time, because the ethyl chloride content was zero.

It will be noted from the data in Table I that at 150° F. only a small amount of ethyl chloride was removed after 60 minutes' contacting time. Whereas at 200° F. 42% of ethyl chloride was hydrolyzed. On the other hand, at the higher and preferred temperatures ranging from 250° to 305° F. from 87% to 100% removal of ethyl chloride was realized.

In the contacting operation of the present invention in which butane contaminated with ethyl chloride is contacted with aqueous alkali metal hydroxide solution at an elevated temperature, it is believed that the ethyl chloride is hydrolyzed to the corresponding alcohol. The alcohol on formation may go into solution in the aqueous solution of alkali metal hydroxide and may be recovered therefrom. In general, ethyl alcohol, formed from the corresponding ethyl chlorides, will dissolve in the aqueous caustic solution. Higher alcohols may remain in solution in the hydrocarbon. In the small quantities involved, such alcohols are beneficial to the performance rating of the fuel. The hydrocarbon is separated from the aqueous solution of alkali metal hydroxide and then may be water washed, if desired, to remove traces of caustic therefrom and may be used as a component of aviation fuel or as a feed stock to a conversion operation, as may be desired, depending on its boiling points and properties.

It will be seen from the foregoing description and examples that the practice of the present invention involves treating an alkyl chloride contaminated hydrocarbon fraction at an elevated temperature with an aqueous solution of an alkali metal hydroxide for a sufficient period of time to cause conversion of ethyl chloride to the corresponding alcohol. The lower alcohols, such as ethyl chloride, dissolve in the alkali metal hydroxide solution which is then separated from the hydrocarbon. As stated, the hydrocarbon may be washed with water to remove traces of caustic therefrom and subjected to other operations, such as fractional distillation and then may be used as a blending agent in processing operations common to petroleum refining processes. A fraction such as one containing iso and normal butane after removal of ethyl chloride by hydrolysis, as described, may then be distilled. The process, it will be clear from the foregoing description, is a simple one ready adaptable and easy to use in the modern petroleum refinery where many operations involve the use of chloride-containing materials which serve to contaminate the desired hydrocarbon fractions.

While the present invention has been described and illustrated primarily in the removal of alkyl chlorides from alkylates and from gasoline boiling hydrocarbons, as well as from the butanes such as iso and normal butane, it is to be understood that the invention is not to be restricted to fractions boiling in the gasoline boiling range. As mentioned before, isomerization products may become contaminated with alkyl chlorides, such as isobutane resulting from the isomerization of normal butane and the butanes effluent from an alkylation reaction zone as described. Likewise, the invention is not restricted to paraffinic hydrocarbons. It is frequently desirable to convert by isomerization one naphthenic hydrocarbon to another, For example, methylcyclopentane may be isomerized to cyclohexane, employing aluminum chloride as the catalyst. Since feed stocks to these processes may contain either naphthenic or paraffin hydrocarbons, the present invention is applicable to treatment of products therefrom for the removal of alkyl chlorides therefrom.

The nature and objects of the present invention having been completely described and illustrated, what we wish to claim as new and useful and to secure by Letters Patent is:

1. A method for treating a butane fraction containing an amount in the range between 0.01 and 0.5 mole percent of ethyl chloride which comprises contacting said butane fraction in the liquid phase with an aqueous solution of an alkali metal hydroxide at an elevated temperature in the range between 250° F. and 305° F. for a sufficient length of time in the range between about 15 and about 60 minutes to form an alcohol from said ethyl chloride, and recovering butane from said contacted butane fraction substantially free of ethyl chloride.

2. A method in accordance with claim 1 in which the butane fraction is isobutane.

3. A method in accordance with claim 1 in which the butane fraction is normal butane.

4. A method for treating butane containing an amount in the range between 0.01 and 0.5 mole percent of ethyl chloride which comprises contacting said butane in the liquid phase with an aqueous solution of an alkali metal hydroxide at an elevated temperature in the range between 250° and 305° F. for a sufficient length of time in the range from about 15 minutes to about 60 minutes to form an alcohol from said ethyl chloride, and recovering a contacted butane substantially free of ethyl chloride.

5. A method for treating butane containing an amount in the range between 0.01 and 0.5 mole percent of ethyl chloride which comprises contacting said butane in the liquid phase with an aqueous solution of sodium hydroxide at a temperature in the range between 250° and 305° F. for a time in the range from about 15 minutes to about 60 minutes to form an alcohol from said ethyl chloride and recovering said contacted butane substantially free of ethyl chloride.

6. A method in accordance with claim 5 in which the solution of sodium hydroxide contains an amount of NaOH in the range between 1% and 30% by weight.

References Cited in the file of this patent

UNITED STATES PATENTS

| | | |
|---|---|---|
| 1,253,055 | Lacy | Jan. 8, 1918 |
| 1,566,818 | Carter et al. | Dec. 22, 1925 |
| 1,984,725 | Britton et al. | Dec. 18, 1934 |
| 2,435,621 | Brooks et al. | Feb. 10, 1948 |
| 2,572,251 | De Benedictis et al. | Oct. 23, 1951 |
| 2,761,888 | Horeczy et al. | Sept. 4, 1956 |